(12) United States Patent
Brendle et al.

(10) Patent No.: US 6,283,390 B1
(45) Date of Patent: Sep. 4, 2001

(54) FUEL INJECTION DEVICE FOR INTERNAL COMBUSTION ENGINES

(75) Inventors: Peter Brendle, Engstingen; Rainer Schneider, Nordstemmen; Achim Eisemann, Neuenstadt, all of (DE); Maximilian Kronberger, Steyr (AT); Herbert Strahberger, Gallneukirchen (AT); Ernst Feichtinger, Leonding (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,279

(22) PCT Filed: Nov. 26, 1998

(86) PCT No.: PCT/DE98/03474

§ 371 Date: Oct. 7, 1999

§ 102(e) Date: Oct. 7, 1999

(87) PCT Pub. No.: WO99/28618

PCT Pub. Date: Jun. 10, 1999

(30) Foreign Application Priority Data

Nov. 28, 1997 (DE) ............................................. 197 52 834

(51) Int. Cl.⁷ ......................... F02M 47/02; F02M 59/00; B05B 1/30
(52) U.S. Cl. ......................... 239/533.2; 239/88; 239/575
(58) Field of Search .............................. 239/88, 124, 127, 239/2, 3, 575, 533.2; 210/429, 430, 416.4, 498, 497.01; 219/121.6

(56) References Cited

U.S. PATENT DOCUMENTS

| 4,239,954 | * | 12/1980 | Howard et al. | 219/121 EH |
|---|---|---|---|---|
| 4,288,330 | * | 9/1981 | Strub | 210/777 |
| 4,378,481 | * | 3/1983 | Brennan et al. | 219/121 EH |
| 4,386,257 | * | 5/1983 | Brennan | 219/121 EH |
| 4,470,945 | * | 9/1984 | Howard et al. | 264/511 |
| 4,932,883 | * | 6/1990 | Hsia et al. | 439/66 |
| 5,181,379 | * | 1/1993 | Wakeman et al. | 60/261 |
| 5,376,252 | * | 12/1994 | Ekstrom et al. | 204/299 R |

* cited by examiner

Primary Examiner—David A. Scherbel
Assistant Examiner—Davis Hwu
(74) Attorney, Agent, or Firm—Ronald E. Greigg; Edwin E. Greigg

(57) ABSTRACT

A fuel injection device for internal combustion engines, having a fuel injection pump, which can be inserted into a housing of the engine and is axially clamped together with a fuel injection valve by means of a clamping sleeve. The valve, with an end remote from the pump, protrudes into a combustion chamber of the engine. A fuel supply line to the fuel injection pump feeds into an annular chamber encompassing the clamping sleeve and, via through openings in the clamping sleeve and inlet conduits in the pump housing, the valve can be connected to a pump working chamber of fuel injection pump. According to the invention, the fuel filter in the inlet to the pump working chamber is constituted by the clamping sleeve, which has a multitude of filter openings for this purpose in its circumference wall, in the vicinity of the annular chamber.

13 Claims, 2 Drawing Sheets

FUEL INJECTION DEVICE FOR INTERNAL COMBUSTION ENGINES

PRIOR ART

The invention is based on a fuel injection device for internal combustion engines. In a fuel injection device of this kind, which is of the unit fuel injector type and is known from EP 0 461 212, a fuel injection pump is axially combined into one component with a fuel injection valve by means of a clamping sleeve, and is inserted along with this valve into the housing of the engine. The fuel injection pump has a piston-shaped pump piston, which is driven by the cam shaft of the engine. The high-pressure fuel quantity delivered into the pump working chamber of the fuel injection pump is controlled during the pressure stroke of the pump piston by means of electric control valve, which is likewise inserted into the component of the injection pump and injection valve and is disposed there on a laterally protruding housing piece. In this connection, a fuel delivery pump sends fuel from a fuel tank by way of a fuel supply line to the fuel injection pump, which feeds into an annular chamber encompassing the clamping sleeve. This annular chamber in the housing of the engine can be connected by way of through openings in the clamping sleeve and furthermore, by way of supply conduits in the pump housing, to the working chamber of the fuel injection pump, wherein this connection can be closed off by the electric control valve. The fuel, which is delivered under high-pressure by the fuel injection pump, thereby travels by means of injection lines to the fuel injection valve and, after a particular opening pressure is exceeded, is injected there via injection openings into the combustion chamber of the internal combustion engine.

In order to protect the injection opening on the fuel injection valve from becoming clogged, and to prevent resultant quantity variations and imprecise injection jet characteristics, fuel injection devices of the unit fuel injector type have fuel filters in the fuel supply line to the fuel injection pump, which filters are comprised of annular filters or button filters embodied as woven screens. Disk filters inside the fuel injection valves are also known. These known fuel filters, however, have the disadvantage that they require additional space and also result in additional manufacture and assembly costs. Moreover, with these known fuel filters, there are problems with regard to their service life, since the effective filter area is relatively small and can therefore become rapidly clogged.

ADVANTAGES OF THE INVENTION

The fuel injection device for internal combustion engines according to the invention, has the advantage over the prior art that the filter function can be taken over by an existing component, so that no additional components are required for fuel filtration in the fuel injection device according to the invention. To that end, a multitude of filter openings are provided in the clamping sleeve, which clamps the fuel injection pump and the fuel injection valve axially against each other, in the vicinity of a fuel-filled annular chamber, which filter openings act as dirt particle filters when fuel passes through. These filter openings are advantageously disposed around the entire circumference of the clamping sleeve so that a large effective filter cross section is produced. The filter holes themselves preferably have a diameter from a 30 to 90 $\mu$m so that even small dirt particles can be reliably filtered out from the fuel. Another advantage of the filter function by means of a perforated clamping sleeve is the possibility of setting specific through-flow values by means of the disposition and design of the filter openings, without additional changes having to be made in other components. Consequently, pressure-regulating functions can be realized in a simple manner, by means of which switching times of the entire fuel injection device can be optimized and additional throttle bores can be eliminated. In this connection, is particularly advantageous to embody the filter holes in the clamping sleeve as conical, with a cross sectional reduction directed radially inward so that a flow reversal of the fuel passing through can also rinse the filter openings clear in a simple manner. Another advantage of the use of the clamping sleeve as a fuel filter is the prevention of possible assembly errors by means of incorrectly inserted or loose fuel filters, which could cause malfunctions in the operation of the fuel injection device. In addition, the fuel filter embodied by the clamping sleeve has a long service life and is very rugged.

The filter openings of the filter sleeve according to the invention are advantageously produced by means of a pulsating electron or laser beam. Each beam pulse produces a filter opening in the sleeve wall, wherein the sleeve is rotated around its axis during processing and the beam tool is moved in a linear fashion so that a helical series of filter openings are produced on the circumference of the filter sleeve. In order to prevent a burr formation on the inner wall of the bores, an elastic material (e.g. silicone) is deposited on the wall side of the filter body remote from the beam, which material evaporates when struck by a the beam during the processing phase and, by means of this vapor pressure, knocks the material cutting out of the filter opening. In order to additionally minimize a burr formation on the outer wall of the bore, the outer surface of the filter sleeve oriented toward the beam is coated with a material that prevents an adhesion of processing cuttings. This surface, which is preferably coated with manganese phosphate, thus prevents an adhesion of the blown-out material cutting.

During the production of the filter openings, different cross sections can be realized by means of the duration and design of the beam pulse and different dispositions can be realized by means of the rotation speed of the filter part, wherein among other things, slots and similar cross sectional shapes are also possible for the filter openings. In addition, the process according to the invention can also be used to produce recesses in work pieces in addition to being used to produce filter openings in filter bodies in entirely different components, where small openings are needed.

Other advantages and advantageous embodiments of the subject to the invention can be inferred from the description, the drawings, and to claims.

BRIEF DESCRIPTION OF THE DRAWINGS

An exemplary embodiment of the fuel injection device for internal combustion engines according to the invention is shown in the drawings and will be explained in detail in the subsequent description.

DESCRIPTION OF THE EXEMPLARY EMBODIMENT

Figure 1:
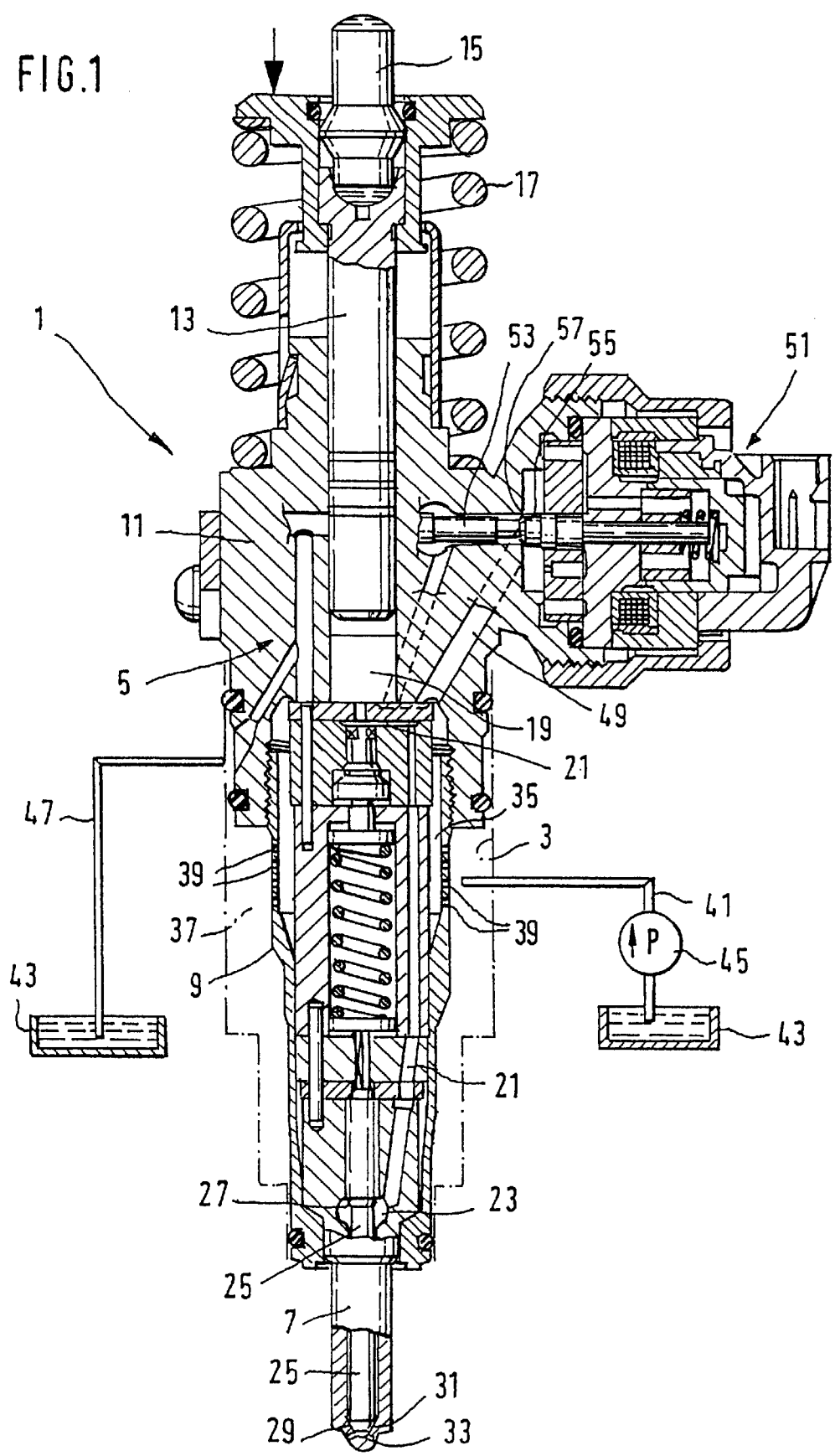
FIG. 1 shows a longitudinal section through the fuel injection device in the housing of the internal combustion engine.

The fuel injection device for internal combustion engines, which is depicted in FIG. 1, is a so-called unit fuel injector 1, which is inserted into a corresponding receiving opening 3 of a housing of the engine, which housing is not shown in detail. The fuel injection device is comprised of a fuel injection pump 5 and a fuel injection valve 7, wherein the fuel injection pump 5 and fuel injection valve 7 are clamped axially against each other by means of a clamping sleeve 9. The fuel injection pump 5 has a pump piston 13, which is guided axially in a pump housing 11 and, via a tappet 15, is driven to reciprocate axially counter to the force of a restoring spring 17 by a drive element that is not shown. With its end face, the pump piston 13 defines a pump working chamber 19 in the pump housing 11, from which a pressure line 21 leads to a pressure chamber 23 inside the fuel injection valve 7. An axially movable, piston-shaped valve member 25 of the fuel injection valve 7 protrudes into this pressure chamber 23 and, in the vicinity of the pressure chamber 23, has an annular shoulder 27 which is engaged by the high fuel pressure prevailing in the pressure chamber 23 in the opening direction of the valve member 25. On its lower end remote from the pump, the valve member 25 has a conical valve sealing face 29 with which it cooperates in a known manner with a conical seat face 31 on the inward-protruding end of the valve member bore, from which at least one injection opening 33 leads into the combustion chamber of the engine to be fed.

The fuel injection device has a low-pressure chamber 35, which is embodied as an inner annular chamber and is formed between the outer circumference wall of the fuel injection valve 7 and the inner wall of the clamping sleeve 9. This inner low-pressure chamber 35 is connected to an outer annular chamber 37 via through openings in the wall of the clamping sleeve 9, wherein the through openings in the wall of the clamping sleeve 9 are embodied as filter openings 39. The outer annular chamber 37 is thereby defined by the outer circumference surface of the clamping sleeve 9 and a wall in the housing of the engine, which is not shown in detail. This outer, fuel-filled annular chamber 37 is also fed by a fuel supply line 41, via which fuel is delivered by means of pre-feed pump 45 from a fuel tank 43 into the annular chamber 37. Furthermore, a return line 47 leads from the outer annular chamber 37 into the tank 43.

Figure 2:
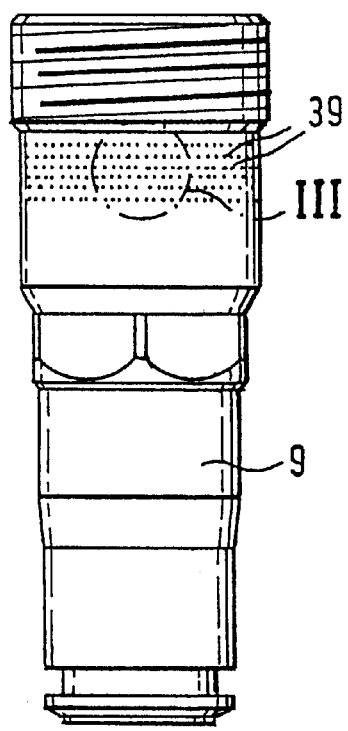
FIG. 2 shows an enlarged detailed depiction of the clamping sleeve embodied as a fuel filter.
Figure 3:
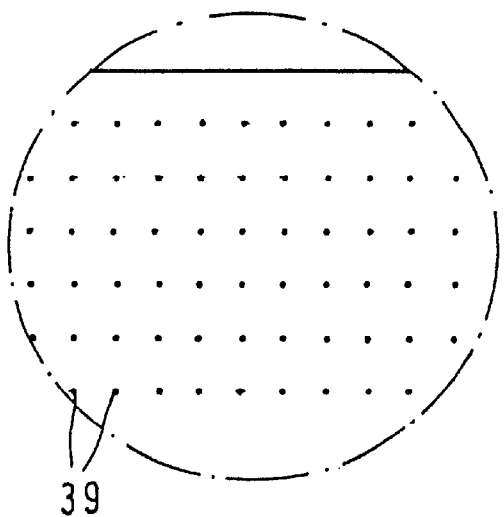
FIG. 3 shows an enlarged detail from the clamping sleeve in the vicinity of the filter openings.
Figure 4:
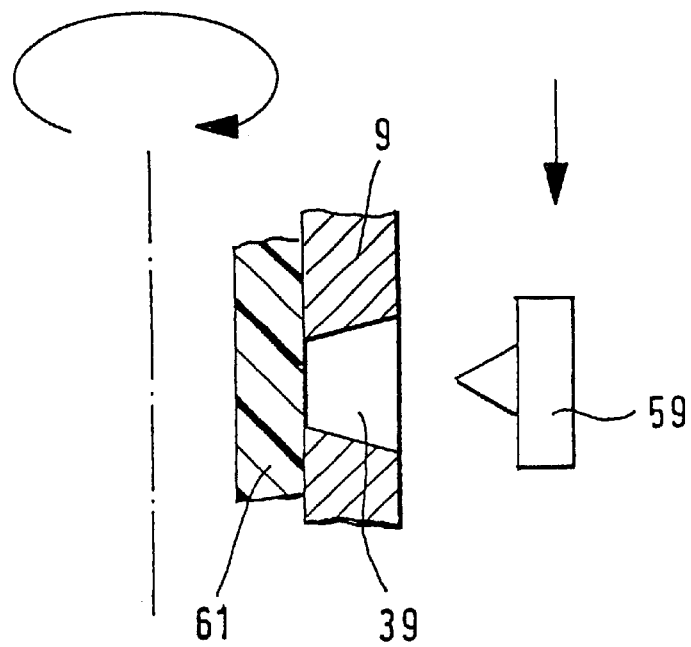
FIG. 4 is a schematic representation of the manufacturing process of the filter openings of the clamping sleeve.

In the housing of the fuel injection pump 5, an inlet conduit 49 is also provided, which, leading from the inner low-pressure chamber 35, feeds into the pump working chamber 19. In order to control the high-pressure delivery of the fuel injection pump 5, an electrically controllable quantity control valve 51 is inserted into this inlet conduit 49, which valve is embodied as a solenoid valve and is inserted into a laterally protruding part of the pump housing. This control valve 51 closes off the through-flow through the inlet conduit 49 by means of a control piston 53, for which purpose the control piston 53 has a valve sealing face 55 with which it cooperates with a stationary valve seat face 57. In order to be able to carry out an effective fuel filtration in the fuel injection device according to the invention, the filter openings 39 in the clamping sleeve 9 constitute a fuel filter between the outer annular chamber 37 and the inner low-pressure annular chamber 35, as shown in an enlarged fashion in FIGS. 2 and 3. These filter openings of the perforated clamping sleeve 9 preferably have a diameter of 30 to 90 μm and are disposed in a series of rows distributed evenly over the circumference of the clamping sleeve 9. Furthermore, the filter openings 39 have a conical cross sectional form shown in FIG. 4, wherein the diameter of the filter holes 39 decreases in a radially inward direction. When the openings are clogged, this conical embodiment of the filter openings 39 produces a flow reversal of the fuel passing through so that the filter openings can be rinsed clear in a simple manner by means of this impetus.

The production of the filter openings 39 in the clamping sleeve 9 is carried out according to the invention by means of an electron or laser beam, wherein the clamping sleeve 9 is rotated around its axis during the production of the filter openings 39. In this connection, the laser beam is made to strike the surface of the clamping sleeve 9 in a pulsating fashion by means of a radiation source 59, wherein each beam pulse corresponds to a filter opening 39. The form and design of the filter openings 39 can be correspondingly adjusted by means of definite pulse durations. In order to achieve an uninterrupted processing of the clamping sleeve 9, the radiation source 59 of the laser beam is also moved in a linear fashion so that during the processing, a helical series of filter openings 39 is produced on the circumferential wall of the clamping sleeve 9.

Furthermore, in order to prevent a burr formation on the inner wall of the clamping sleeve 9, an underlying material 61 comprised of an elastic material, e.g. silicone, is disposed on the inner wall of the clamping sleeve 9. This underlying material 61 evaporates when struck by the perforation beam and thus by means of the vapor pressure produced, drives the cut out material out of the filter opening bore 39. In order to also prevent a burr formation on the outer wall of the clamping sleeve 9, the outer surface of the clamping sleeve 9 oriented toward the beam is coated with a material which prevents an adhesion of processing cuttings. This outer coating is preferably constituted by manganese phosphate.

The fuel injection device for internal combustion engines according to the invention functions in the following manner. With the beginning of the operation of the engine, the pump piston 13, by way of a cam drive and the tappet 15, is driven to reciprocate axially counter to the restoring force of the spring 17. At the same time, the fuel pre-feed pump 45 fills the low-pressure chamber 35 with fuel from the fuel tank 43 by way of the supply line 41 and fills the outer annular chamber 37 with low-pressure fuel, wherein this fuel is fine filtered upon passage through the filter openings 39 in the clamping sleeve 9. The fuel travels from the low-pressure chamber 35 on into the pump working chamber 19 of the fuel injection pump 5 by way of the open inlet conduit 49. During the outward feed stroke motion of the pump piston 13, the pump working chamber 19 is filled with fuel. In the subsequent, downward delivery stroke, the pump piston 13 first displaces a part of the fuel disposed in the pump working chamber 19 back into the low-pressure chamber 35 by way of the inlet line 49, which is still open. If the intent is for the high-pressure delivery to begin, the electrical control valve 51 is supplied with current and closes the inlet conduit 49. As a result, in the pump working chamber 19, which is now closed off from the low-pressure chamber 35, a high fuel pressure is built up during the continued feed stroke motion of the pump piston 13 and extends to the valve seat 31 of the fuel injection valve 7 via the pressure line 7. After the opening pressure value is exceeded, the high fuel pressure in the pressure chamber 23 causes the valve member 25 to lift up from the valve seat 31 in a known manner so that the high-pressure fuel can be injected by way of the injection openings 33 into the combustion chamber of the internal combustion engine.

The high-pressure fuel injection is ended by virtue of the fact that the electrical control valve 51 is disconnected from the current again so that the control piston 53 lifts up from the valve seat 57 and opens the inlet conduit 49 between the pump working chamber 19 and the low-pressure chamber 35 once more so that the high pressure is rapidly relieved into the low-pressure chamber 35, wherein this drop below the injection opening pressure results in a rapid closing of the fuel injection valve.

The fine fuel filtration in the above-described fuel injection device is thereby carried out in a structurally simple manner by means of filter openings 39 in the clamping sleeve 9 so that additional fuel filters can be eliminated. In the above-described exemplary embodiment of the fuel injection device according to the invention, the filter sleeve is inserted into a so-called unit fuel injector, but annular filters of this kind can also be used in all other fuel injection systems.

The foregoing relates to a preferred exemplary embodiments of the invention, it being understood that other variants and embodiments thereof are possible within the spirit and scope of the invention, the latter being defined by the appended claims.

What is claimed is:

1. A fuel injection device for internal combustion engines, comprising a fuel injection pump (5), which is inserted into a housing of the engine, said fuel injection pump is axially clamped together with a fuel injection valve (7) by means of a clamping sleeve (9), said fuel injection valve with an end remote from the pump, protrudes into a combustion chamber of the engine, a fuel supply line (41) to the fuel injection pump (5) feeds fuel into an outer annular chamber (37) encompassing the clamping sleeve (9) and, via through openings (39) in the clamping sleeve (9) and inlet conduits (49) in the pump housing, the clamping sleeve is connected to a pump working chamber (19) of the fuel injection pump (5), a fuel filter is provided in the fuel inlet of the fuel injection pump (5), said fuel filter is constituted by the clamping sleeve (9) and has a multitude of filter openings (39) in a circumference wall in a vicinity of the annular chamber (37).

2. The fuel injection device according to claim 1, in which the filter openings (39) are embodied as round filter bores, which have a diameter of 30 to 90 μm.

3. The fuel injection device according to claim 1, in which the filter openings (39) are embodied as conical in an axial direction, wherein the cross section decreases in a radial inward direction in relation to the clamping sleeve (9).

4. The fuel injection device according to claim 2, in which the filter openings (39) are embodied as conical in an axial direction, wherein the cross section decreases in a radial inward direction in relation to the clamping sleeve (9).

5. The fuel injection device according to claim 1, in which a number of rows of filter openings (39) are provided in the wall of clamping sleeve (9), wherein an overall through-flow cross section can be adjusted by means of a design of the filter openings (39).

6. The fuel injection device according to claim 1, in which in a vicinity of the outer annular chamber (37), which is defined by the housing wall of the engine, the clamping sleeve (9) defines an inner annular chamber, which constitutes a low-pressure chamber (35) and is disposed inside the clamping sleeve (9), from said chamber the inlet conduits (49) lead into the pump working chamber (19) of the fuel injection pump (5).

7. The fuel injection device according to claim 1, in which an electric control valve (51) is inserted into the inlet conduit (49) to the pump working chamber (19) and is used to control the high-pressure delivery of the fuel injection pump (5).

8. A process for producing filter openings (39) in filter bodies of fuel injection devices, by means of an electron or laser beam, depositing an elastic material on a wall side of the filter body remote from the beam, said elastic material evaporates when struck by the beam during the processing phase, and thereby rinses the material that is cut out of the processed filter opening (39).

9. The process according to claim 8, in which the elastic material is constituted by silicone.

10. The process according to claim 8, in which the electron or laser beam is supplied in a pulsating fashion, wherein one beam pulse is provided for each opening produced and an opening form of the filter opening (39) is set via the duration of this beam pulse.

11. The process according to claim 10, in which during processing, the filter body (9) is rotated around the filter axis and the radiation source (59) is moved in a linear fashion so that a helix of filter openings (39) is produced along the circumference of the sleeve-shaped filter body (9).

12. The process according to claim 8, characterized in which the outer surface of the filter body (9) oriented toward the beam is coated with a material that prevents an adhesion of processing cuttings.

13. The process according to claim 8, in which the surface of the filter body oriented toward the beam is coated with manganese phosphate.

* * * * *